Figures 1, 2:
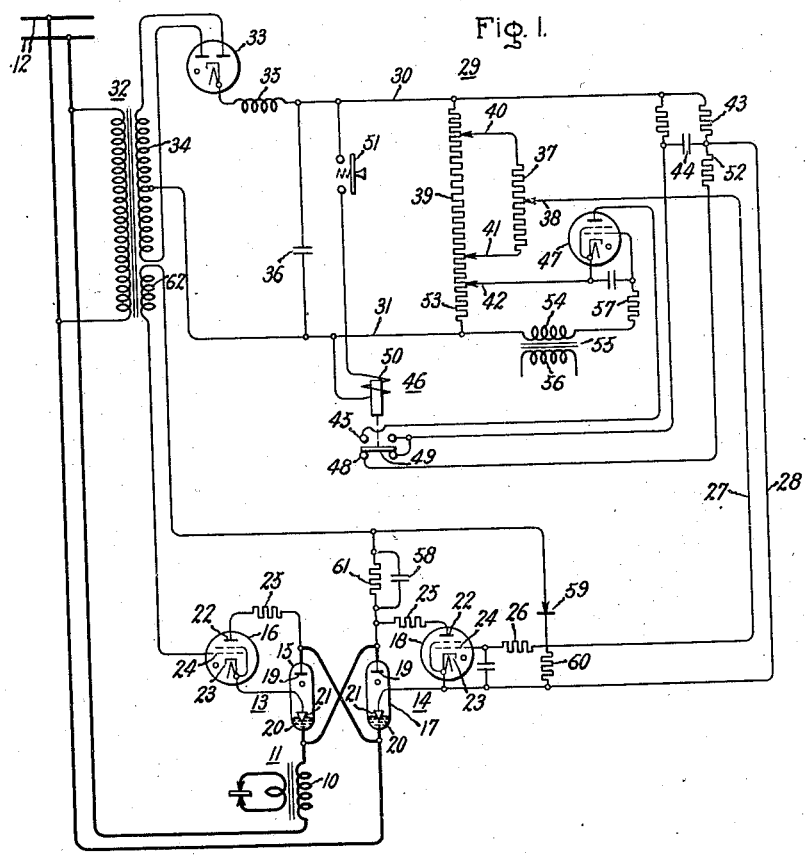

Dec. 28, 1943.  B. COOPER  2,337,871

ELECTRICAL CONTROL CIRCUIT

Filed April 25, 1942

Inventor:
Benjamin Cooper,
by Harry E. Dunbar
His Attorney.

Patented Dec. 28, 1943

2,337,871

UNITED STATES PATENT OFFICE 2,337,871

ELECTRICAL CONTROL CIRCUIT

Benjamin Cooper, Scotia, N. Y., assignor to General Electric Company, a corporation of New York Application April 25, 1942, Serial No. 440,465

3 Claims. (Cl. 250—27)

My invention relates to electric control circuits and more particularly to improved electric control circuits for controlling one of a plurality of electric valve means in response to the conductivity of another of the electric valve means.

In many applications it is desirable to initiate conduction of one electric valve means in accordance with conduction of another electric valve means such as for example, in electronic circuits used for resistance welding. In these circuits electric valve means are often reversely connected with respect to both the alternating current supply circuit and the welding load circuit so that alternating current of variable magnitude may be transmitted to the load circuit during accurately determinable intervals of time established by a timing circuit. It is advantageous to control only one of the reversely connected electric valve means by this timing circuit and to control the other electric valve means in accordance with the intervals of conduction of the first electric valve means in order to simplify the control circuit required for the timing of both electric valves. In accordance with the teachings of my invention I provide an improved control system of this character which, while not limited thereto, is particularly adapted to control in leading and trailing relationship, a pair of reversely connected electric valves which are to operate intermittently to effect intermittent energization of an alternating current load circuit.

It is an object of my invention to provide a new and improved electric control circuit.

It is another object of my invention to provide an improved circuit for controlling one of a pair of electric valves disposed to conduct during succeeding half cycles of voltage in accordance with the conduction of the other of the valves.

It is a further object of my invention to provide an improved electric control circuit for controlling a pair of electric valves in leading and trailing relationship which operates satisfactorily with loads of widely varying power factor.

It is still another object of my invention to provide a new and improved electric control circuit for effecting the intermittent energization of a load circuit through electric valve means which requires a minimum of control equipment.

In accordance with the illustrated embodiment of my invention I provide a control circuit for a pair of reversely connected electric valves which effects intermittent energization of the load circuit energized by the valves and in which only one of the reversely connected valves is controlled directly by the operation of a timing circuit provided to determine the duration of the periods of energization of the load circuit. The other electric valve means is controlled in accordance with the conductivity of the first electric valve means by means of a capacitor which is connected in series with a unilaterally conductive device and across the principal electrodes of the first electric valve means. The capacitor is charged during the positive half cycle of voltage impressed on the first mentioned electric valve means when said electric valve means is non-conducting. This capacitance is connected in series with a source of periodic voltage and to the control member of the other electric valve means. The periodic voltage is derived from the alternating current supply circuit energizing the principal electrodes of the reversely connected electric valve means and is substantially in phase therewith so that it tends to render the electric valve means conductive. The voltage of the capacitor tends to maintain the control electrodes negative so that when charged in response to a period of nonconduction of the first mentioned electric valve it tends to prevent the second valve from conducting. A discharge circuit continuously conductive with respect to the voltage of the capacitor is connected in parallel therewith so that the negative or hold-off voltage of the capacitor may diminish in magnitude during a period of conduction of the first mentioned electric valve means. The magnitude of the voltage of the capacitor and of the periodic voltage which is in phase with the anode voltage of the second electric valve is chosen so that the second electric valve means conducts for each half cycle of voltage immediately following a half cycle of conduction of the first electric valve means.

For a better understanding of my invention reference may be had to the following description taken in connection with the accompanying drawing and its scope will be pointed out in the appended claims. Fig. 1 of the drawing shows diagrammatically one embodiment of my invention, and Fig. 2 represents certain operating characteristics of the system of Fig. 1.

Referring to Fig. 1, the primary winding 10 of a resistance welding transformer 11 is connected to be energized by alternating current from an alternating current supply circuit 12. The interval of energization of and magnitude of the current supplied to the primary winding 10 are controlled by reversely connected electric valve means 13 and 14 interconnecting the supply circuit 12 and the primary winding 10. As illustrated, the electric valve means 13 and 14 comprise electric valves 15, 16 and 17, 18, respectively. Electric valves 15 and 17 each comprise an envelope within which are housed an anode 19, a cathode of conducting liquid 20, such as mercury, and an immersion igniter type of control member 21. The electric valves 16 and 18 are preferably of the type utilizing a gas or vapor and each comprises an anode 22, a cathode 23, and a control member or grid 24. As illustrated, the valves 16 and 18 are connected in the energizing circuit of the immersion igniter control members 21 of the electric valves 15 and 17. The anode of electric valve 16 is connected to the anode of electric valve 15 through a resistor 25 and the cathode of electric valve 16 is connected to the immersion igniter control member 21 of valve 15. Similarly, the anode of electric valve 18 is connected to the anode of electric valve 17 through a resistor 25 and the cathode thereof is connected to the control member of electric valve 17. It will be readily understood that the electric valve means 13 and 14 need not each comprise two electric valves and if desired two valves of the type of construction of valves 16 and 18 may be connected directly in the power circuit.

In order to effect the energization of the welding transformer 11 for a predetermined number of cycles of the supply circuit 12 I provide an electronic timing circuit for controlling the energization of the control electrode 24 of electric valve 18. The timing voltage is impressed on the control member of electric valve 18 through a current limiting resistor 26 by means of conductors 27 and 28 which are energized from an electronic timing circuit designated generally by the numeral 29. The timing circuit is energized from direct current lines 30 and 31 which are energized from the alternating current supply circuit 12 through a transformer 32 and an electric discharge device 33 which is connected with the secondary winding 34 of the transformer to provide a full wave rectifier. The output of the rectifier is filtered by inductance 35 and capacitance 36 before it is impressed on the direct current lines 30 and 31. The voltage of the control member 24 is maintained at a definite value by the conductor 27 which is connected to a voltage dividing resistor 37 by an adjustable tap 38. The resistor 37 is connected across a portion of resistor 39 by means of adjustable taps 40 and 41. Resistor 39 is in turn connected across the direct current lines 30 and 31. A parallel circuit from the direct current line 30 to an adjustable tap 42 on resistor 39 is completed through a resistor 43, capacitor 44, the normally open contacts 45 of a switching device 46, and the anode-cathode circuit of an electric valve 47. In addition to the contact 45, the switch 46 includes fixed contacts 48, a movable contact 49 and an operating coil 50 which is energized from the direct current lines 30 and 31 under the control of the manual switch 51. The movable contact 49 bridges the fixed contacts 48 when the coil 50 is deenergized and is moved into contact with fixed contacts 45 when the coil 50 is energized. When the contacts 48 are bridged by contact 49 a discharge circuit for the capacitor 44 is established through a resistor 52. When the coil 50 is energized a charging circuit for condenser 44 is established through electric valve 47, fixed contacts 45, and the movable contact 49. In order to synchronize the initiation of the charging of the condenser 44 with the voltage of the alternating current supply circuit 12 the control member of the valve 47 is maintained nonconductive by a negative bias obtained from the lower portion 53 of resistor 39. The valve 47 is rendered conductive by a voltage of peaked wave form obtained from the secondary winding 54 of a transformer 55. The primary winding 56 of transformer 55 is energized by a voltage having a definite phase relation with respect to the voltage of the supply circuit 12 and is preferably energized directly therefrom through a phase shifting circuit (not shown). A current limiting resistor 57 is connected in series with winding 54 and the control member of electric valve 47.

In order to control the conductivity of electric valve 15 in response to the conductivity of electric valve 17 means are provided for impressing on the control member 24 of firing valve 16 a negative bias obtained from the positive half wave of voltage impressed on the anode of electric valve 17. As illustrated in the drawing, this bias is obtained by connecting a capacitor 58 across the principal electrodes of electric valve 17 through a unilaterally conducting device 59 which may be an electric discharge valve or, as illustrated, a contact rectifier. A suitable impedance element such as resistor 60 is connected in series with the condenser 58 and device 59 to control the charging rate of the condenser. A resistor 61 connected in parallel with the condenser 58 provides a discharge path for the condenser 58 which is continuously conductive with respect to the voltage of the condenser and which provides for the discharge of the capacitor 58 independently of the conduction of the firing valve 16. The cathode-to-control member circuit of electric valve 16 is completed from the condenser 58 through a transformer winding 62 energized from the transformer 32 to supply control member 24 of valve 16 an alternating current voltage component. This voltage is in phase with the anode-cathode voltage of the firing valve 16 in the arrangement illustrated although it may be made to lead this voltage if found desirable to obtain the desired operation of trailing valve 15.

The features and advantages of the present invention will become more apparent by a brief consideration of the operation of the illustrated embodiment of the invention. With the alternating current supply circuit 12 energized and the cathodes of electric discharge devices 16, 18 and 33 at operating temperature a direct current voltage is impressed across the resistor 39. The control member 24 of electric valve 18 is maintained at the potential of the slider 38 which is negative with respect to the potential of the cathode of electric valve 18 maintained by conductor 28 when switch 51 is open and electric valve 47 is nonconductive. The condenser 44 at this time is fully discharged by the discharge circuit established therefor when switch 46 is in the deenergized position and bridging contact 49 engages fixed contacts 48. When it is desired to initiate a period of energization of the load circuit switch 51 is closed. This closes bridging contact 49 on fixed contacts 45 and as soon as the first positive voltage peak occurs in transformer winding 54 the electric valve 47 is rendered conductive. This reduces the voltage of conductor 28 and the cathode of electric valve 18 to substantially the voltage of the tap 42 which is at a substantial negative potential with respect to the control member 24 of the valve 18. This renders the electric valve 18 conductive which in turn passes sufficient current through the immersion igniter control member of electric valve 17 to initiate discharge therein. Upon initiation of discharge in electric valve 47 condenser 44 starts to charge and after a predetermined time the voltage of conductor 28 approaches the voltage of direct current line 30 and thus becomes more positive than the control member 24 to render electric valve 18 nonconducting. Thus, after a predetermined number of positive half cycles of voltage depending on the position of tap 38, the electric valve means 14 is rendered nonconducting. When the switch 46 is released the anode-cathode circuit of electric valve 47 is interrupted and the discharge circuit for condenser 44 is established through resistor 52 to insure that the condenser is fully discharged when it is desired to initiate another period of energization of the load circuit. Thus far the description of operation has been confined to the operation of the timing circuit in connection with the electric valve means 14 comprising valves 17 and 18. The electric valve means 13 is rendered conductive for each half cycle immediately following a period of conductivity of the valve means 14 by a circuit including condenser 58 which is charged in accordance with the voltage across the principal electrode of electric valve 17 through the unilaterally conducting device 59 and resistor 60. It is to be noted that the device 59 is poled in such a way that the condenser 58 is charged during positive half cycles of voltage impressed on the valve 17 so that the condenser is charged during periods of positive anode voltage of device 17 when valve 17 does not conduct. The voltage on condenser 58 has superimposed thereon an alternating current voltage from the winding 62 which is preferably in phase with or advanced with respect to the anode-cathode voltage of the electric valve 15. Thus, if electric valve 17 is nonconductive during the half cycle that the anode thereof is positive the condenser 58 is charged to impress a negative voltage of sufficient magnitude on the control member 24 of electric valve 16 to render electric valve 14 nonconducting during the succeeding half cycle. If, however, electric valve 17 is rendered conductive the voltage for charging capacitor 58 is reduced to the arc drop of valve 17 and condenser 58 discharges through resistor 61 during the half cycle that electric valve 17 is conducting. At the beginning of the next half cycle the voltage of condenser 58 is reduced to such a value that the alternating current component of voltage of winding 62 is sufficient to render electric valve 16 conducting. In this way the electric valve 15 is made to conduct for the next half cycle following conduction of electric valve 17 and to remain nonconductive for any half cycle immediately following a half cycle of nonconduction of electric valve 17. This is often referred to as controlling the electric valves 17 and 15 as leading and trailing valves, respectively.

A better understanding of the relation of the various voltages of the circuit of Fig. 1 may be had by reference to Fig. 2 in which $E_{12}$ represents the voltage of supply circuit 12. It is assumed for purposes of this explanation that electric valves 15 and 17 are disposed in the circuit so that valve 15 may conduct during the positive half cycles of the voltage $E_{12}$ and valve 17 may conduct during the negative half cycles of the voltage $E_{12}$. The voltage on the condenser 58 is illustrated by the curve $E_{58}$. It will be noted that this voltage reaches its maximum negative value at the end of a half cycle of voltage during which the valve 17 or the leading valve has been maintained non-conductive by its control member and that the voltage of the capacitor decreases during the succeeding half cycle of voltage during which the valve 15 is disposed to conduct if it were not maintained nonconductive by its control member. However, the resultant voltage of the control member 24 of the firing valve 16 of electric valve 15 is still negative as illustrated by the curve $E_{62}$ which shows the voltage resulting from superimposing the alternating current voltage of transformer winding 62 on the voltage of the condenser 58. However, when electric valve 17 conducts the voltage of condenser 58 continues to reduce in magnitude and, as illustrated at the right-hand end of Fig. 2, the resultant voltage on the control member 24 of valve 16 becomes more positive than the critical voltage at the beginning of the next half cycle of voltage immediately following the half cycle during which the valve 15 conducts. The dotted curve shows the voltage of condenser 58 which would have existed if valve 17 had not been rendered conductive.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current supply circuit, a load circuit, reversely connected electric valve means interconnecting said circuits for controlling the alternating current supplied to said load circuit, control electrodes for controlling the conductivities of said electric valve means, means for impressing a voltage on one of said control electrodes to control the conductivity of one of said electric valves, means comprising a capacitor and a unilaterally conductive device conductively connected across said one of said electric valve means for producing a bias voltage, and means connecting said capacitor with the control electrode of said other electric valve means to render said other electric valve means conductive only during half cycles of voltage of said supply circuit immediately following a period of conduction of said one electric valve means.

2. In combination, an alternating current supply circuit, an alternating current load circuit, reversely connected electric valve means interconnecting said circuits and each comprising a pair of principal electrodes and a control electrode, means for impressing on the control electrode of one of said electric valve means a voltage for rendering said valve means conductive for a predetermined number of half cycles of said alternating current supply circuit, means for energizing the control member of the other of said electric valve means to render said other electric valve means conductive for each half cycle of said supply circuit voltage immediately following a half cycle of conduction of said first electric valve means comprising a capacitor, means for charging said capacitor in accordance with the voltage of the principal electrodes of said first mentioned electric valve means, a source of voltage having the periodicity of said alternating current supply circuit, means connecting said capacitor and said source of periodic voltage in circuit with the control electrode of said second electric valve means with said capacitor connected to provide a hold-off bias, and a discharge circuit continuously conductive with respect to the voltage of said capacitor for discharging said capacitor during the interval that said first mentioned electric valve means is conductive.

3. In combination, an alternating current supply circuit, an alternating current load circuit, reversely connected electric valve means interconnecting said circuits for transmitting alternating current therebetween, control electrodes for controlling the conductivities of said electric valve means, means for impressing a voltage on one of said control electrodes to render one of said electric valve means conductive, means responsive to the voltage impressed on said one electric valve means for producing a unidirectional control voltage when said first mentioned electric valve means is maintained nonconductive by the state of energization of the control electrode associated therewith, means for impressing said control voltage on the control electrode of said other electric valve means with a polarity tending to render said other electric valve means nonconductive, a discharge path continuously conductive with respect to said control voltage producing means for decreasing the magnitude of said control voltage during the interval that said first mentioned electric valve means is conductive to render said second mentioned electric valve means conductive in response to a period of conductivity of said first mentioned electric valve means.

BENJAMIN COOPER.